(12) United States Patent
Wang (10) Patent No.: US 8,111,872 B2
(45) Date of Patent: Feb. 7, 2012

(54) IMAGE MAZE GENERATING SYSTEM AND METHOD THEREOF

(75) Inventor: Feng-Hsing Wang, Yongkang (TW)

(73) Assignee: Altek Corporation, Hsinchu (TW)

( * ) Notice: Subject to any disclaimer, the term of this patent is extended or adjusted under 35 U.S.C. 154(b) by 1024 days.

(21) Appl. No.: 12/071,192

(22) Filed: Feb. 19, 2008

(65) Prior Publication Data

US 2009/0154760 A1    Jun. 18, 2009

(30) Foreign Application Priority Data

Dec. 14, 2007   (TW) ................................ 96148017 A (51) Int. Cl.
*G06K 9/00* (2006.01)
*A63F 9/24* (2006.01)

(52) U.S. Cl. ......................................... 382/100; 463/15

(58) Field of Classification Search .................. 382/100, 382/181, 213, 232, 298, 305, 312; 345/441, 345/442, 588; 463/9, 15; 472/62; 348/207.99
See application file for complete search history.

(56) References Cited

U.S. PATENT DOCUMENTS

| | | | |
|---|---|---|---|
| 6,273,420 B1 * | 8/2001 | Brooks ..................... 273/153 R |
| 6,309,306 B1 * | 10/2001 | Geagley et al. ................. 472/60 |
| 6,347,995 B1 * | 2/2002 | Igarashi et al. ................. 463/15 |
| 6,485,017 B1 * | 11/2002 | Ng ................................ 273/108 |
| 6,650,952 B1 * | 11/2003 | Garcia et al. .................... 700/91 |
| 7,928,983 B2 * | 4/2011 | Pedersen et al. ............. 345/442 |
| 2007/0004492 A1 * | 1/2007 | Salmento ....................... 463/15 |

* cited by examiner

*Primary Examiner* — Kanjibhai Patel
(74) *Attorney, Agent, or Firm* — Rosenberg, Klein & Lee (57) ABSTRACT

The present invention discloses an image maze generating system. The system is suitable for use with a digital camera to generate a maze of photographs. The system specially includes an image processing module and an image maze generating module. The image processing module assigns numbers to the photographs. And then the image maze generating module pieces the photographs together on a template which is attached to maze path information according to its numbers to generate the maze of photographs.

17 Claims, 7 Drawing Sheets

|  | 5 | 1 | 2 | 3 | 4 | 5 |
|---|---|---|---|---|---|---|
| starting point ▼ | 4 | 2 | 2 | 1 | 5 | 3 |
| 1 | 2 | 3 | 5 | 1 | 5 | 2 | 1 |
| 2 | 3 | 4 | 4 | 2 | 3 | 4 | 5 |
| 3 | 1 | 2 | 3 | 4 | 5 | end point ▼ |
| 4 | 5 | 3 | 2 | 5 | 1 | |

IMAGE MAZE GENERATING SYSTEM AND METHOD THEREOF

BACKGROUND OF THE INVENTION

1. Field of the Invention

This invention relates to an image maze generating system and method thereof and particularly to a system suitable for a digital camera to generate a maze of photographs and method thereof.

2. Description of Related Art

A digital camera is widespread at a high pitch, so a user, when shopping goods, considers the basic photography functions and extra functions that are attractive. In order to make a shot image to be more vivid, the digital camera is generally provided with many image repair tools to process the image, and the tool may be used to repair the issues mentioned above caused by a disproportionate background at the time of shoot or by ghosts due to tremor of the hands.

The image repair tool generally synthesizes the image through a template. The so-called template is a registering that is given in the form of image layer. The template is generally designed into a template with many vivid background patters or characters, and the shot image is pasted onto the template or the template is further combined with another template, thereby infinite creativity being exerted by the user for beautifying and editing amusing photos.

However, although the template provided by the digital camera may process, synthesize, and piece the photos, it works merely in the simple image processing procedure that is not interesting.

Consequently, because of the technical defects of described above, the applicant keeps on carving unflaggingly through wholehearted experience and research to develop the present invention, which can effectively improve the defects described above.

SUMMARY OF THE INVENTION

In consideration of the mentioned-above defects of prior art, a maze generation function is added to a digital camera in this invention so that shot images may be randomly assembled into a maze of photographs to make the device to be more interesting in use and further make the added value of digital still camera (DSC) to be higher.

Thus, this invention is mainly to provide an image maze generating system and method thereof that assigns numbers to the digital photographs and lays the digital photographs at a position corresponding to a template formed with a maze path according to the assigned numbers to generate the maze of photographs.

The present invention discloses an image maze generating system. The system is suitable for use with a digital camera to generate a maze of photographs. The digital camera comprises an input module, a display unit, and the image maze generating system. The input module is provided for a user to input at least one command to control the image maze generating system; the display unit is used to display an operation menu of the digital camera.

The image maze generating system particularly comprises a processing unit, a memory unit, an image processing module, and an image maze generating module. The processing unit is coupled to the input module and the display unit. The memory unit is coupled to the processing unit to store a plurality of digital images and at least one template file, in which the template file is a PSD file grouped with a background, an iconograph, a frame, an art and special effect, characters and the like as image layers, and defines a plurality of blocks and information on size, coordinates, maze path and the like in each of the blocks. The image processing module is coupled to the processing unit to process the digital image according to the information (defined requirements) of the template file. The image maze generating module is coupled to the processing unit to arrange the digital images well processed by the image processing module into the maze of photographs.

The maze path is the information that is given by default in the template file, or is applied in the template file after being generated dynamically.

In an embodiment of this invention, the user selects a plurality of specified images and one specified template file from the input module, in which the specified images are subsets of the digital images and the specified template file is one of the template files. The image processing module comprises an image tailoring unit and an image resizing unit that are used to respectively tailor and reduce/enlarge the specified images. The image maze generating module comprises an encoding unit that is used to assign a number to each of the specified images that are well processed; and a maze generating unit that is used to place the specified images corresponding to the maze path on the specified template file to generate the maze of photographs.

In an embodiment of this invention, the digital camera is a mobile phone, a personal digital assistant (PDA), a digital still camera (DSC), or a digital camera.

In an embodiment of this invention, the digital camera is wired or wirelessly coupled to a computer system to download the template file on the Internet, and the file is transferred to the digital camera.

The present invention further discloses a method for generating the image maze that is suitable for use with a digital camera to generate a maze of photographs. The digital camera is provided with a memory unit in which a plurality of digital images and at least one template file are stored. The method comprises the following steps: executing an image processing program for a plurality of specified images, in which the specified images are tailored and reduced/enlarged according to the information on the specified template file selected from the template files; assigning non-repeated numbers to the specified images that are well processed; finally placing the specified images numbered corresponding to the information on the specified template file and further saving the specified template files that are well pieced as the maze of photographs as image file in the memory unit.

The specified images are the subsets of digital images, and the template file defines a plurality of blocks and information on size, coordinates, maze path and the like in each of the blocks.

In an embodiment of this invention, after the non-repeated numbers that are not repeated are respectively assigned to the specified images that are well processed, a step of executing the maze generation program inclusively runs to generate a random maze path and then copy the maze path in the specified template file.

In an embodiment of this invention, after the maze of photographs is stored, the maze of photographs is inclusively developed and printed.

In order to further elaborate the technical means and effects adopted for the object of this invention, refer to the detailed description according to this invention accompanied with drawings; it is believed that the object, features, and points of this invention will be apparent from the description; however, the accompanied drawings are provided for reference and illustration only and not limited to this invention.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Currently, the digital camera, such as the DSC, is provided with a built-in template file to edit the shot photo for a satisfying photo. The template is called a registering as a PSD file comprising the background, the iconograph, the frame, the art and special effect, the characters and the like as image layers. After being asked to only remove the background of photo and adjust the scale of photo, the user merges the image layers with the template to easily add various effects to the photo.

Accordingly, the image maze generating system according to this invention provides a template having information on the maze path, on which the photo is applied to give the effect of image maze.

Regarding the art in this invention, it is characterized that the plurality of digital images stored in the digital camera is generated and formed into the maze of photographs. Necessary internal system structure and operation thereof are described below. However, all those skilled in the art know that the following members and the digital camera certainly comprises other essential components, thereby being not limited to what is disclosed in the embodiment.

Figure 1:
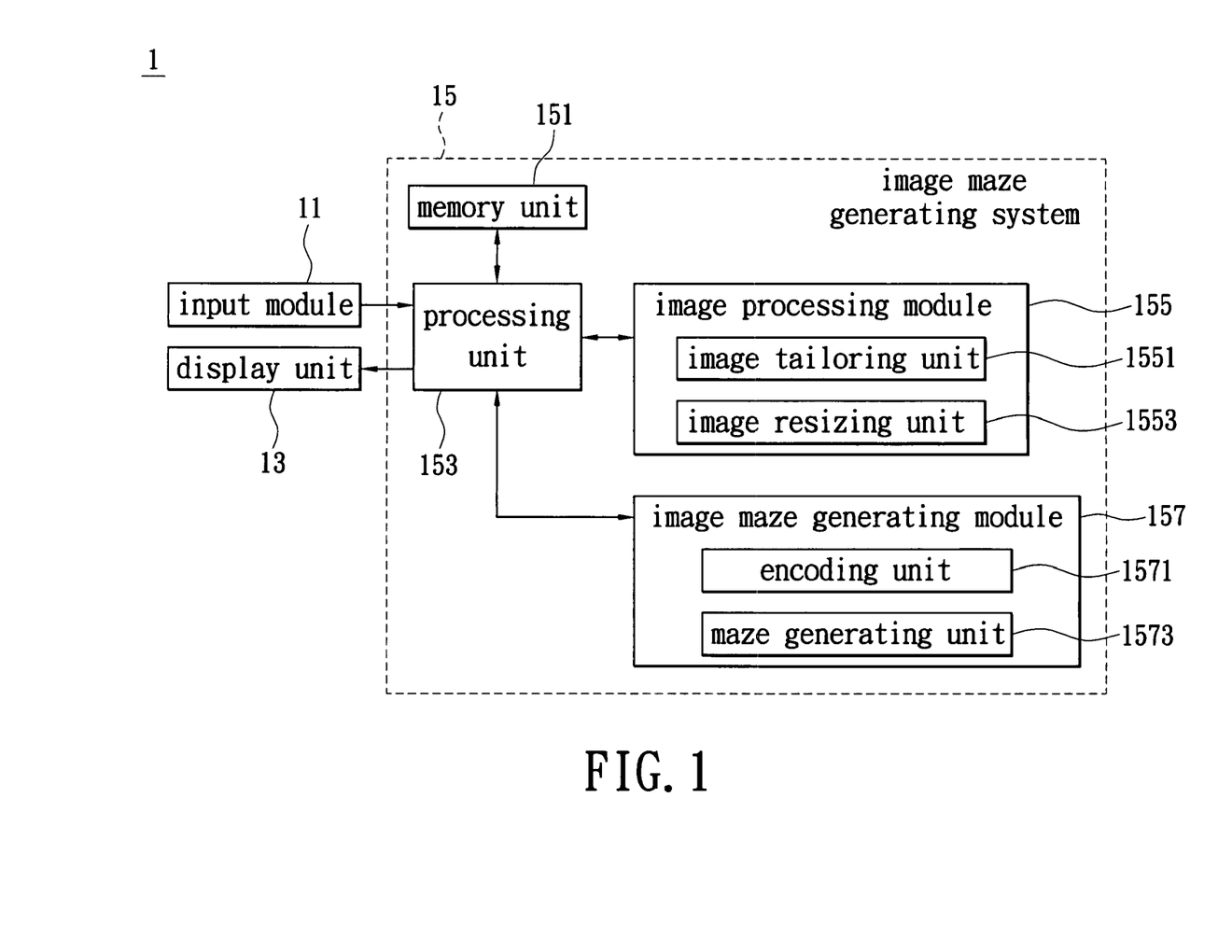
FIG. 1 is a schematic view illustrating the structure of an image maze generating system in an embodiment of this invention.

Refer to FIG. 1 as a schematic view illustrating the structure of image maze generating system in an embodiment of this invention. As shown in FIG. 1, the image maze generating system 15 is suitable for use with the digital camera 1 to generate the maze of photographs. The digital camera 1 comprises an input module 11, a display unit 13, and the image maze generating system 15. The input module 11 is provided for a user to input at least one command to control the image maze generating system 15; the display unit 13 is used to display an operation menu, a template file, a digital image, and a maze of photographs of the digital camera 1. Concretely, the digital camera 1 is part of a mobile phone, a personal digital assistant (PDA), a digital still camera (DSC), or a stand alone digital camera. The input module 11 is made up with a plurality of function keys; the display unit 13 is a LCD.

The image maze generating system 15 particularly comprises a processing unit 153, a memory unit 151, an image processing module 155, and an image maze generating module 157. The processing unit 153 is coupled to the input module 11 and the display unit 13. The memory unit 151 is coupled to the processing unit 153 to store the plurality of digital images and at least one template file. The template file is built in the digital camera 1 or stored in the memory card. Probably the digital camera 1 is wired or wirelessly coupled to a computer system to download the template file on the Internet, and the file is transferred to the digital camera 1.

The image processing module 155 is coupled to the processing unit 153 to process the digital image according to the information (defined requirements) of the template file. The image maze generating module 157 is coupled to the processing unit 153 to arrange the digital images well processed by the image processing module 155 into the maze of photographs.

The image processing module 155 comprises an image tailoring unit 1551 and an image resizing unit 1553. The image tailoring unit 1551 is used to tailor the digital image; the image resizing unit 1553 is used to reduce or enlarge the digital image. The image maze generating module 157 comprises an encoding unit 1571 that is used to assign a number to each of the images; and a maze generating unit 1573 that is used to place the specified images corresponding to the maze path on the template file to generate the maze of photographs.

Figure 2:
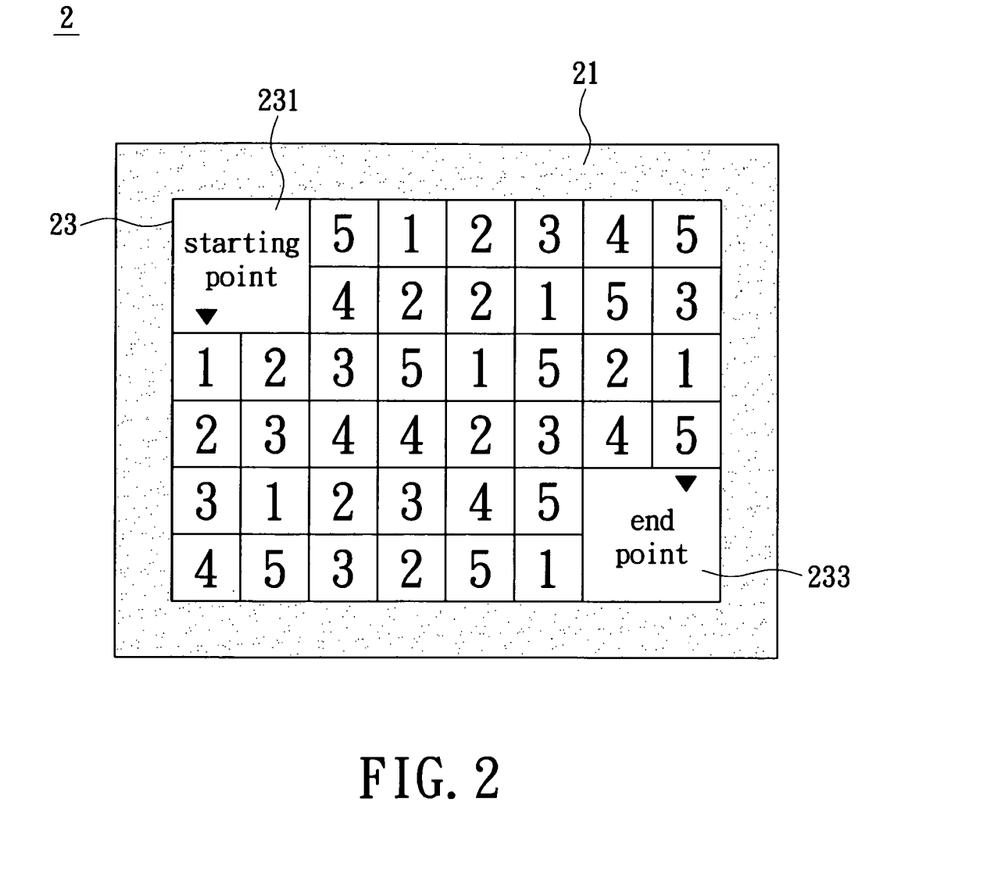
FIG. 2 is a schematic view illustrating a template file in an embodiment of this invention.
Figure 3:
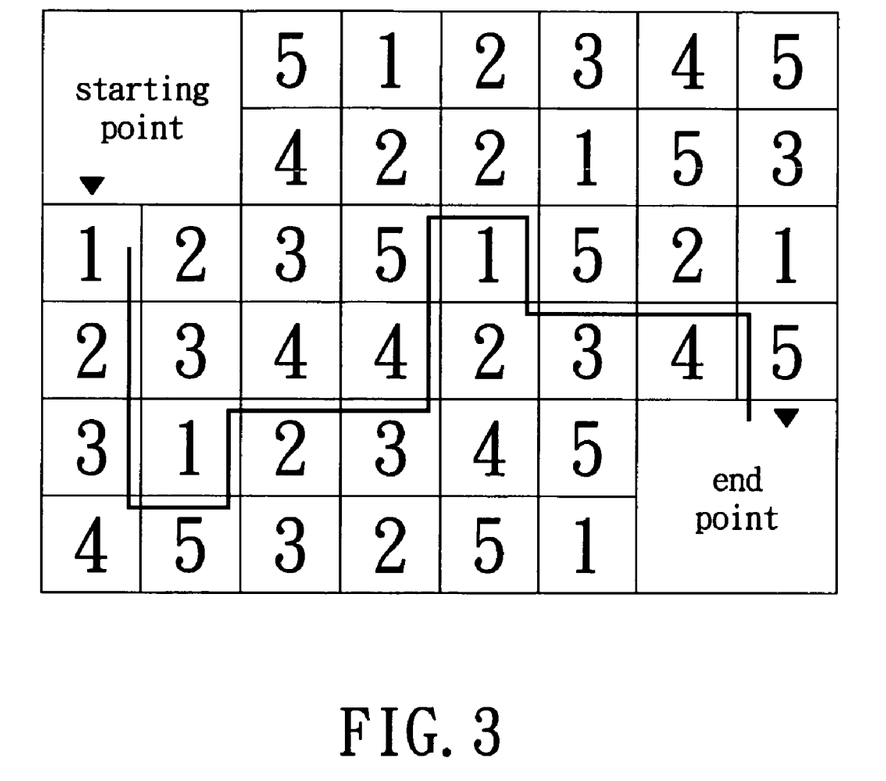
FIG. 3 is a schematic view illustrating a maze path in an embodiment of this invention.

With reference to FIG. 2 as a schematic view illustrating a template file in an embodiment of this invention. As shown in FIG. 2, a template file 2 is particularly provided with a background image layer 21 and a maze path image layer 23. The maze path image layer 23 is divided into a plurality of blocks (grids) and defines the information on the size, coordinates, and maze path and the like of each of the blocks. Each block is numbered, and the maze path starts from an initial block 231 to a final block 233, in which the information is recorded in each of the blocks of which the numbers are assigned in increasing or decreasing order. Refer to FIG. 3 as a schematic view illustrating a maze path in an embodiment of this invention. In FIG. 3, it is apparent that the maze path defined in the maze path image layer 23 is correctly solved.

The maze path image layer 23 is given in the template file 2 by default or is applied in the template file 2 after being generated dynamically.

Figure 4:
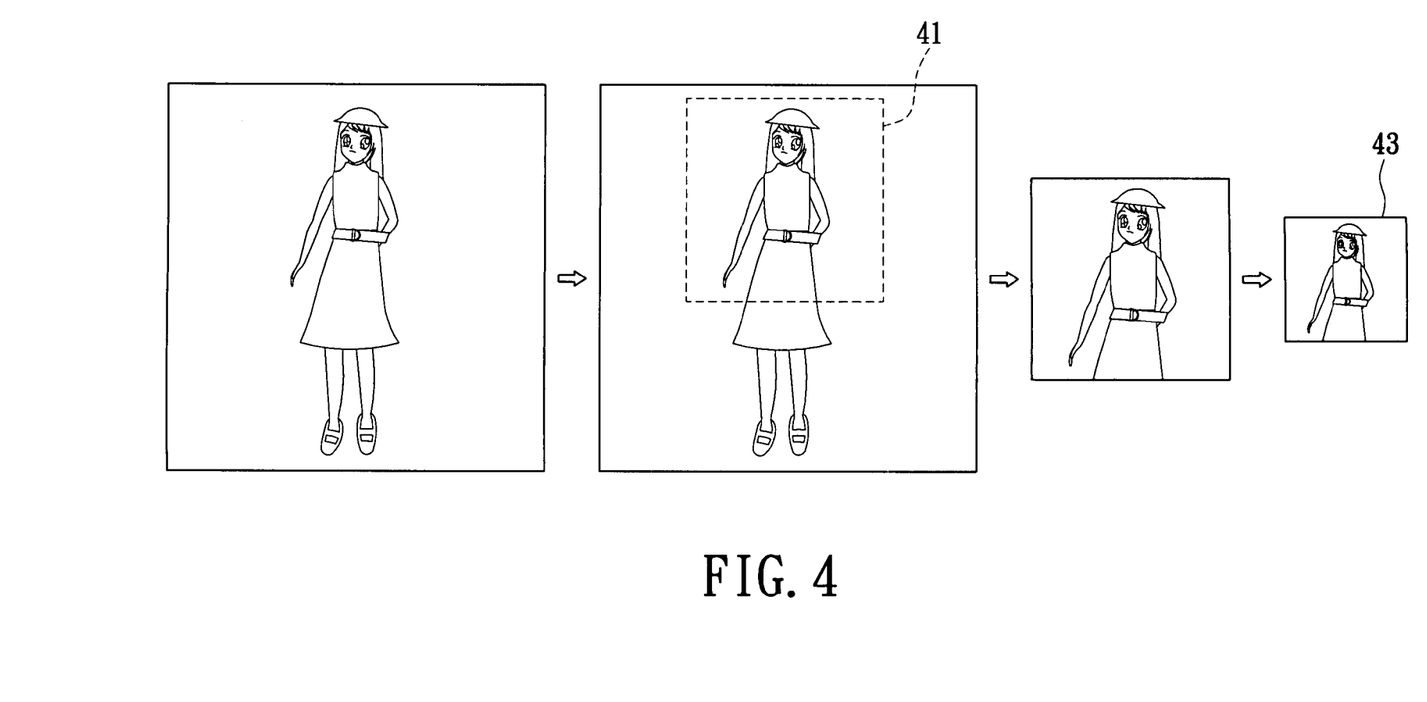
FIG. 4 is a schematic view illustrating an image processing program in an embodiment of this invention.
Figure 5:
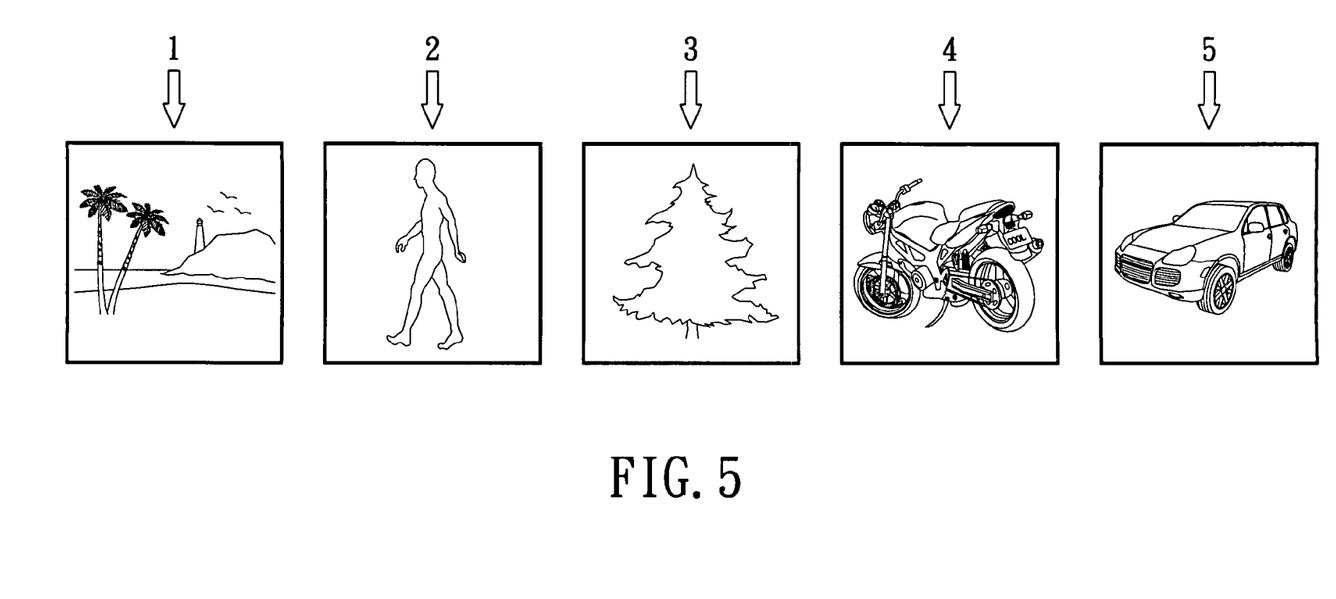
FIG. 5 is a schematic view illustrating a digital image encoding program in an embodiment of this invention.
Figure 6:
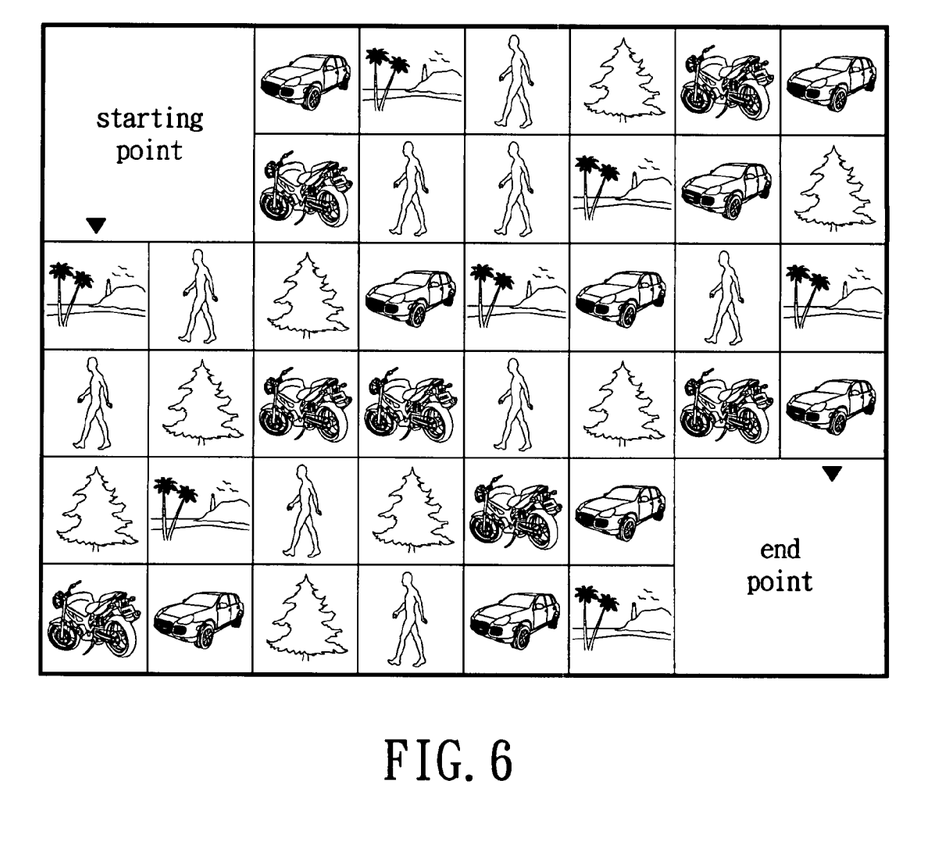
FIG. 6 is a schematic view illustrating a template covering program in an embodiment of this invention.

Refer to FIGS. 4 through 6, and refer to FIGS. 1 and 2 for the related structure of system. In an embodiment, the plurality of specified images and a specified template file are selected by the user using the input module 11, in which the specified images are the subsets of digital images and the specified template file is selected from the template files. As shown in FIG. 4, after the image tailoring unit 1551 picks one portion of each of the specified images for a tailored image 41, the image resizing unit 1553 reduce or enlarge each of the tailored images 41 for a resized image 43, in which the size of resized image 43 is that of each block on the maze path image layer 23 in the specified template file 2. Next, as shown in FIG. 5, the encoding unit 1571 assigns a number to each of the resized image 43; later as shown in FIG. 6, the maze generating unit 1573 places the corresponding resized image according to the number and coordinates on each block to generate the maze of photographs 6.

The maze generating unit 1573 further inclusively runs a maze generating program; namely, after the maze path image layer 23 that is dynamically generated is applied to the template file 2, the resized images are placed respectively according to the assigned numbers and coordinates on the blocks divided from the maze path image layer 23 to generate the maze of photographs 6.

Figure 7:
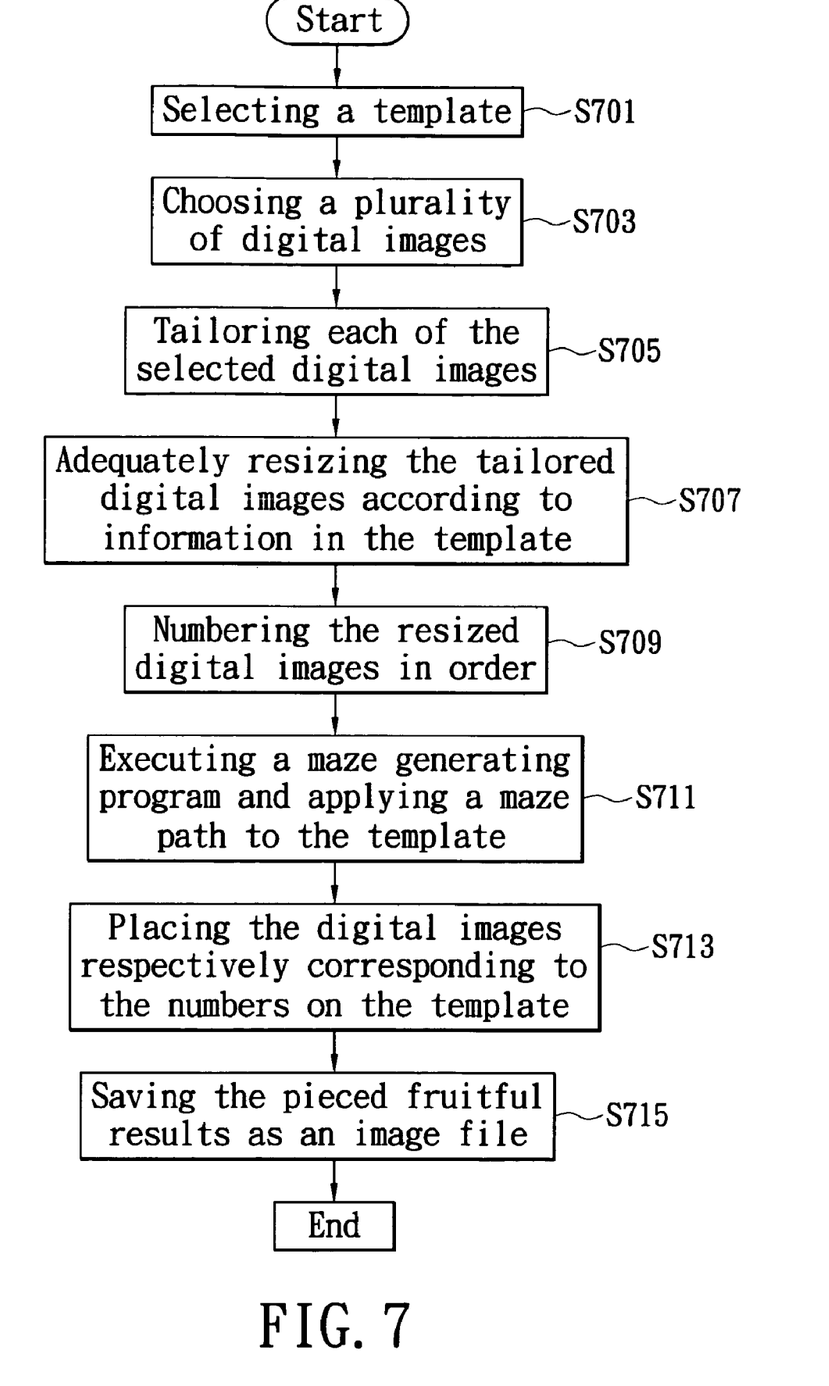
FIG. 7 is a step flow chart of a method for generating the image maze that is disclosed in this invention.

Refer to FIG. 7 as a step flow chart of a method for generating the image maze that is disclosed in this invention. Also, refer to FIG. 1 illustrating the related structure of system. As shown in FIG. 7, the method for generating the image maze comprises the following steps.

First, generate the maze of photographs. Concretely, the user selects the function of "making an image maze" by using the input module 11 and select a template file (step S701) and the plurality of digital images (step S703) through a display unit 13.

Then, tailor each digital image selected for a required portion (step S705); adequately resize the tailored digital image according to the size of block in the template file (step S707).

Next, assign in order a number to each of the resized digital images (step S709); run the maze generating program that generates a random maze path and applies the maze path to the template file (step S711);

Finally, place the corresponding numbered digital images according to the assigned numbers and coordinates of the blocks in the template file (step S713) and save the pieced fruitful results as an image file in the memory unit 151 (step S715).

In an embodiment, if the selected template file offers the information on maze path by default, the program dynamically generating the maze path at step S711 may be skipped, the corresponding numbered digital images are placed directly according to the assigned numbers and coordinates of the default blocks provided in the template file (step S713), and the fruitful results are saved as the image file in the memory unit 151 (step S715). Following step S715, the step of developing and printing the maze of photographs is further included.

From the embodiments described above in details, it is apparent that the image maze generating system and method thereof that is disclosed in this invention numbers the digital images stored in the digital device and places the images in the template file provided with the information on maze path according to the assigned numbers to generate the interesting maze of photographs. Only following the sequential numbers assigned to the maze of photographs to travel from a starting point to an end point, the user may browse many photos and meanwhile have fun in solving the maze.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image maze generating system, suitable for a digital camera to generate a maze of photographs, comprising:
    a memory unit used to store a plurality of digital images and at least one template file;
    an image processing module used to process the digital images according to information in the template file;
    an image maze generating module used to arrange the digital images processed by the image processing module into the maze of the photographs; and
    a processing unit coupled to the memory unit, the image processing module, and the image maze generating module, in order to control operations of the memory unit, the image processing module, and the image maze generating module.

2. The image maze generating system according to claim 1, wherein the digital camera is contained in a mobile phone, a personal digital assistant (PDA), a digital still camera (DSC), or is a stand alone digital camera.

3. The image maze generating system according to claim 1, wherein the digital camera further comprises:
    an input module coupled to the processing unit and provided for a user to input at least one command to control the processing unit; and
    a display unit coupled to the processing unit to display an operation menu, the template file, the digital images, and the maze of the photographs on the digital camera.

4. The image maze generating system according to claim 3, wherein the digital images processed by the image processing module are a plurality of specified images combined with the digital images selected by the user using the input module.

5. The image maze generating system according to claim 4, wherein the image processing module comprises:
    an image tailoring unit used to retrieve one portion of each of the specified images for a tailored image; and
    an image resizing unit used to resize each of the tailored images for a resized image according to information in the template file.

6. The image maze generating system according to claim 4, wherein the image maze generating module comprises:
    an encoding unit used to assign a distinct number to each of the resized images; and
    a maze generating unit that generates a maze path, numbers the template file according to the maze path, and places the numbered resized image corresponding to a number of the numbered template file to generate the maze of the photographs.

7. The image maze generating system according to claim 4, wherein the image maze generating module comprises:
    an encoding unit used to assign a distinct number to each of the resized images; and
    a maze generating unit that places the numbered resized image according to a default maze path on the template file to generate the maze of the photographs.

8. The image maze generating system according to claim 1, wherein the template file is a PSD file grouped with a background, an iconograph, a frame, an art and special effect, characters and the like as image layers, and defines a plurality of blocks and information on a size, a coordinate, and a maze path in each of the blocks.

9. The image maze generating system according to claim 1, wherein the digital camera is wired or wirelessly coupled to a computer system to transfer the template file.

10. A method for generating an image path, suitable for a digital camera to generate a maze of photographs, the digital camera being provided with a memory unit in which a plurality of digital images and at least one template file are stored, the method comprising steps of:
    executing an image processing program for a plurality of specified images;
    assigning a distinct number to each of the specified images; and
    placing the numbered specified images according to information in a specified template file selected from the template file stored in the memory unit;
    the specified images being the subsets of digital images, and the template file defining a plurality of blocks and information on a size, a coordinate, and a maze path in each of the blocks.

11. The method according to claim 10, wherein the image processing program comprises steps of:
    tailoring the specified images for generation of tailored images; and resizing the tailored images according to the information in the specified template file.

12. The method according to claim 10, wherein placing the specified images according to the information in the specified template file further comprises a step of:
   saving the specified template file where the images are pieced as an image file in the memory unit, in which the image file is the maze of the photographs.

13. The method according to claim 12, wherein the step of saving the maze of the photographs is accompanied by:
   developing or printing the maze of the photographs.

14. The method according to claim 10, wherein the template file is provided with a default maze path.

15. The method according to claim 10, after assigning the distinct number to the specified image, further comprising executing a maze generation program to randomly generate the maze path before applying the maze path to the specified template file.

16. The method according to claim 15, wherein the maze path of the template file is for a placement of a corresponding resized image to generate the maze of the photographs.

17. The method according to claim 10, wherein the specified image and the specified template file are user selectable.

* * * * *